United States Patent [19]

Milton

[11] Patent Number: 4,896,798

[45] Date of Patent: Jan. 30, 1990

[54] PAN CANDY AND NUT MEAT PRODUCT VENDING MACHINE APPARATUS

[75] Inventor: Edward L. Milton, Idaho Falls, Id.

[73] Assignee: Innovative Design and Marketing, Inc., Idaho Falls, Id.

[21] Appl. No.: 919,889

[22] Filed: Oct. 15, 1986

[51] Int. Cl.[4] ........................ B65D 88/54; G01F 11/06

[52] U.S. Cl. ........................ 222/307; 222/352; 194/255

[58] Field of Search ................ 194/292, 255; 222/305, 222/307, 308, 350, 349, 438, 440, 352

[56] References Cited

U.S. PATENT DOCUMENTS

| | | | |
|---|---|---|---|
| 603,309 | 5/1898 | Yeagley | 222/352 X |
| 768,412 | 8/1904 | Wagner | 194/255 |
| 976,383 | 11/1910 | Linder | 222/352 X |
| 1,725,497 | 8/1929 | Webber | 194/292 |
| 2,154,443 | 4/1939 | French | 222/350 X |
| 3,029,002 | 4/1962 | Gregoire | 222/307 |

FOREIGN PATENT DOCUMENTS

| | | | |
|---|---|---|---|
| 103708 | 2/1942 | Sweden | 222/352 |

*Primary Examiner*—Joseph J. Rolla
*Attorney, Agent, or Firm*—K. S. Cornaby

[57] ABSTRACT

A coin-operated particulate product vending machine, such as for candy, nuts and the like, has a horizontally disposed elongate cylindrical product dispensing chamber having a cylindrical tumbler rotatably disposed therein with an aperture for receiving and dispensing particulate product. A plurality of flexible elongate members are disposed about the interior surface of the product dispensing chamber which brush the exterior surface of the tumbler as it rotates from the product receiving mode to the product dispensing mode. The flexible members meter the product flowing into the tumbler and prevent product from escaping around the sides of the tumbler. They also prevent the product from passing through the tumbler from the dispensing chamber to a discharge chute as the tumbler is rotated. The tumbler also has a slideably mounted plunger for varying the size of the tumbler product containing chamber. The plunger can be adjusted externally of the tumbler without opening the tumbler or removing it from the vending machine.

2 Claims, 4 Drawing Sheets

PAN CANDY AND NUT MEAT PRODUCT VENDING MACHINE APPARATUS

BACKGROUND OF THE INVENTION

Small stand-alone vending machines, such as that conventionally used to vend round gum balls or peanuts, have been in public use for many years. The conventional machine most familiar to consumers is a cast metal lower unit fitted with a clear glass or plastic globe which retains the product to be vended. Such machines are provided both in table top and in stand-alone formats. While such machines have been manufactured in a variety of forms, the underlying basis of them all is a rotating circular plate upon which the vended product sits, the plate being provided with one or more (conventionally, 3) apertures through which the product is distributed.

In operation, such conventional vending machines utilize a handle which rotates about a horizontal axis, the handle being affixed to a gear which meshes with gear-teeth on the outer periphery of the aforementioned circular rotating plate. When a coin is inserted and the handle is turned, the product dispensing plate rotates in a horizontal plane about its vertical axis until an aperture in the product dispensing plate is aligned with a product delivery chute, and the product falls into the chute.

Such conventional gum ball machines (termed "pan candy" by those in the trade) have worked well, and continue to work well for their intended purpose. However, a principal defect in such machines is that one cannot vary the amount of product to be dispensed through the apertures in the rotating plate, so that the operator of the device is severely limited in his choice of candy or nut meats to be dispensed through such machines. For instance, such a device set up to dispense a predetermined quantity of a relatively small pan candy or nut (such as regular M&M's or small peanuts) could not thereafter be adjusted to deliver a more generous portion of a larger pan candy or nut meat (such as M&M Peanuts or cashew nuts). The only reasonable alternative is to purchase and maintain a relatively large number of machines to accommodate the many different sizes of pan candies and nut meats.

Additionally, because of the particular design of such prior vending machines, it has been found difficult to combine the individual units into multiple-unit devices. Because of the space inefficiencies inherent in the horizontally disposed rotating plate of the prior art, such units have been combined, if at all, only by affixing discreet individual units to a common connecting base member. Because of the difficulty in affixing the units to one another, and the expense involved in providing multiple discrete individual units, such units typically display only a single product.

Therefore, it is an object of this invention to provide a pan candy and nut meat product dispensing apparatus which can be adapted to conveniently display a plurality of product choices in a single unit.

It is a further object of this invention to provide a product dispensing means which is adjustable so that the owner/operator may utilize the vending machine to vend products of dispirit sizes.

It is a still further object of this invention to provide dispensing means which cause little or no damage to the product being dispensed.

SUMMARY OF THE INVENTION

This invention comprises a pan candy and nut meat dispensing apparatus which may be provided with a plurality of separate product bays, each with its own coin-actuation means. Significantly, products to be dispensed from this apparatus cannot be broken, abraided, torn, etc., during the dispensing procedure as a result of ridged surfaces sweeping product away from the product dispensing means. Additionally, the apparatus is provided with means to vary the volume (and therefore the capacity) of the product dispensing means, thereby permitting an individual bay to be adapated for distribution of inummerable products of differing size and bulk density.

In particular, 2 or 3 product bays may be integrally formed in a single unit with a removable partition there between. Product is dispensed from each bay by cylindrical tumbler which is provided with a moveable piston therein, which enables the capacity of the tumbler to be varied. For instance, when dispensing a product having a relatively large individual piece size (such as cashew nuts) the plunger may be adjusted to increase the capacity of the tumbler, whereas, when dispensing a product of individual piece size, the plunger can be adjusted to decrease the capacity of the tumbler. Each product bay is provided with a coin-actuation means which includes: a handle rotatable about a longitudinal axis coinciding with the longitudinal axis of the tumbler; coin-accepting means adapted to prevent rotation of the handle and tumbler in the absence of an appropriate coin; depth gage means adapated to prevent rotation of the handle and tumbler if a coin of improper thickness is present; anti-reverse means which prevents counter rotation of the tumbler after proper rotation in the presence of an appropriate coin has begun; and flexible anti-bleed through means which prevents the dispensing of product in excess of that intended to be dispensed. The anti-bleed through means "sweep" across the surface of the tumbler to remove excess product, while at the same time preventing product to "bleed" between the tumbler and interior walls of the device.

DETAILED DESCRIPTION OF THE INVENTION

Figure 1:
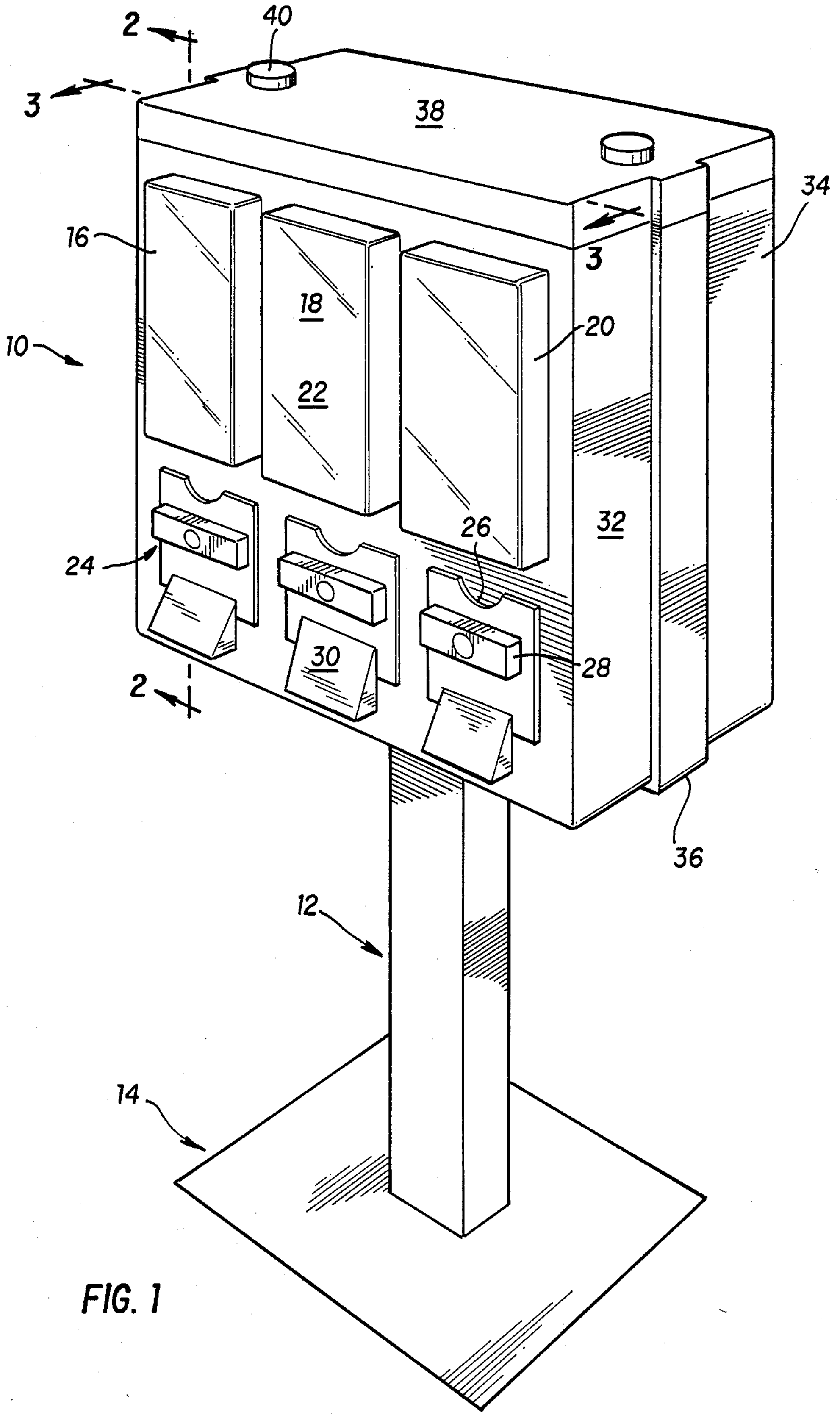
FIG. 1: is a perspective view of one emboidment of the present invention.

The present invention is shown, in general, in FIG. 1. As shown therein, the invention comprises a dispensing unit, 10, a stand, 12 and a base, 14. It is to be understood that while the invention is shown in FIG. 1, as a stand-alone unit, it is equally susceptible to being provided as a table-top unit when provided with an appropriate stand. The dispensing unit 10, of FIG. 1 is illustrated with 3 individual food product bays 16, 18, 20, each with a see-through front panel, 22 so that the customer may view the product prior to purchase. The front panel 22 may be made of high impact plastic in order to reduce the chance of breakage. The 3 individual bays 16, 18, 20 of FIG. 1 are separated by dividers (not shown) so that different products may be used in each bay. Each of the bays is provided with coin-actuation means, generally indicated at 24, which is responsible for dispensing of the product. The coin-actuation means 24 comprises a coin slot 26, a rotatable handle 28, and a spring-loaded product door 30 from which the product is dispensed.

It is contemplated that the most convenient method of manufacture of the present invention is through injection molding of high impact plastics. As shown in FIG. 1, a front piece 32 (which also comprises the front half of the bottom of the unit) and a back piece 34 (which also includes the rear portion of the bottom of the dispensing unit) are joined at a seam 36. A top member 38 is affixed to the lower portion of the dispensing unit with lockable screws, bolts, or other conventional means 40.

Figure 2:
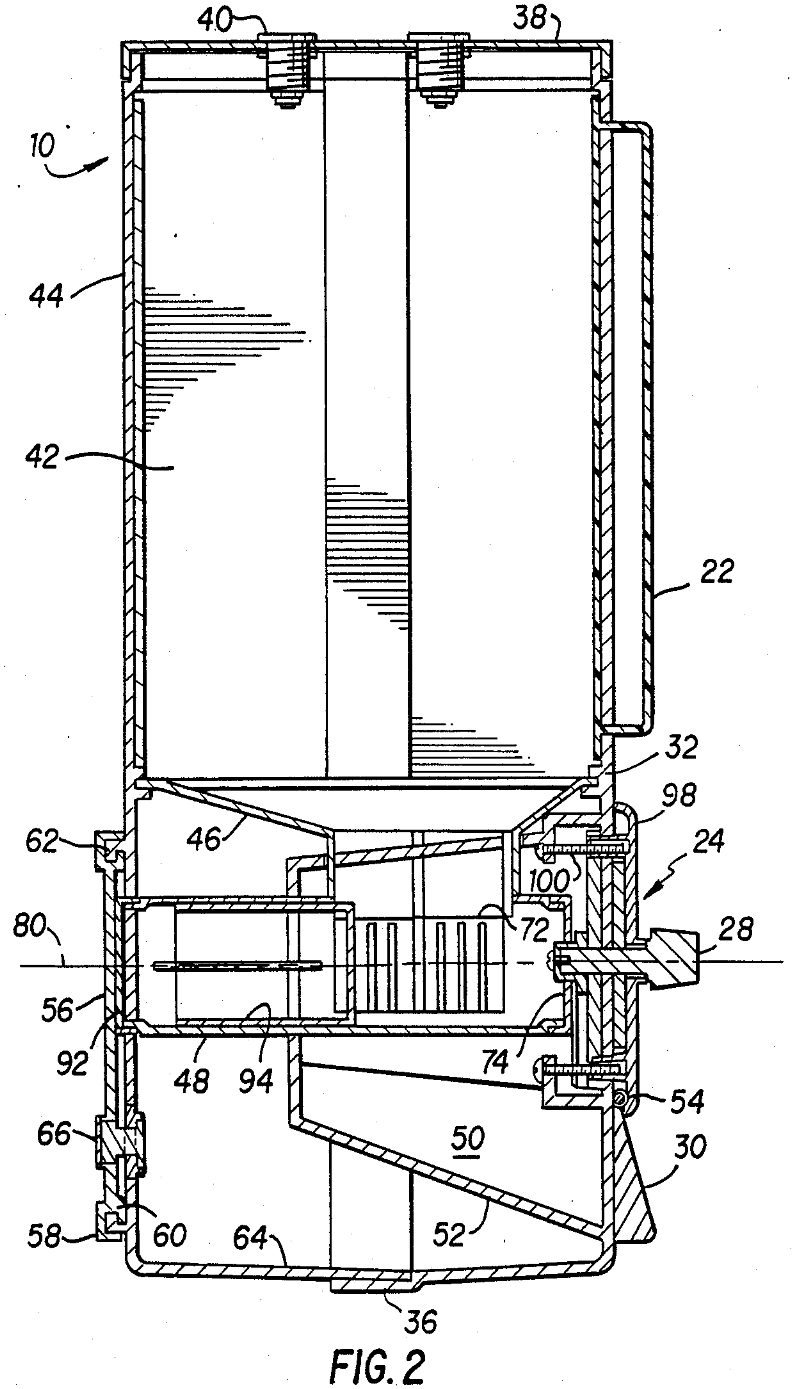
FIG. 2: is a side sectional veiw taken along lines 2—2 of FIG. 1.

As shown in FIG. 2, an individual bay comprises a large product holding area 42 defined by the front panel 22, the top 38, a back panel 44 and a lower funnel portion 46. Products susceptible to being delivered in predetermined quantities, such as nuts, M&M's, Boston Baked Beans, etc., can be placed in the product area 42, by removing the lockable means 40 and the top 38 and filling the area 42, with product.

Each coin activation means 24 cooperates with a product dispensing means 48, in the form of a tumbler, which meters out a predetermined quantity of product to be directed into the dispensing chamber 50. The dispensing chamber 50, is provided with a downwardly sloping bottom wall 52, and the product is retained therein until the door 30, is opened and the product is dispensed to the consumer. The door 30 can be spring loaded, as by spring 54 to retain the product in the chamber 50 until the door is opened. Access may be gained to the tumbler 48 through a door 56 provided in the rear of the unit. While any number of methods well known in the art may be used for affixing the door 56 to the back panel 44, as shown in FIG. 2 the door is slideably mounted to the back panel by the use of retaining members 58, 60 on the door 56, which slideably engage tongue 62 on back panel 44. As money is ultimately collected on the upper surface 64 of the bottom portion of the dispensing unit, a lock 66 is necessary to securely affix the sliding door to the back panel.

Figure 3:
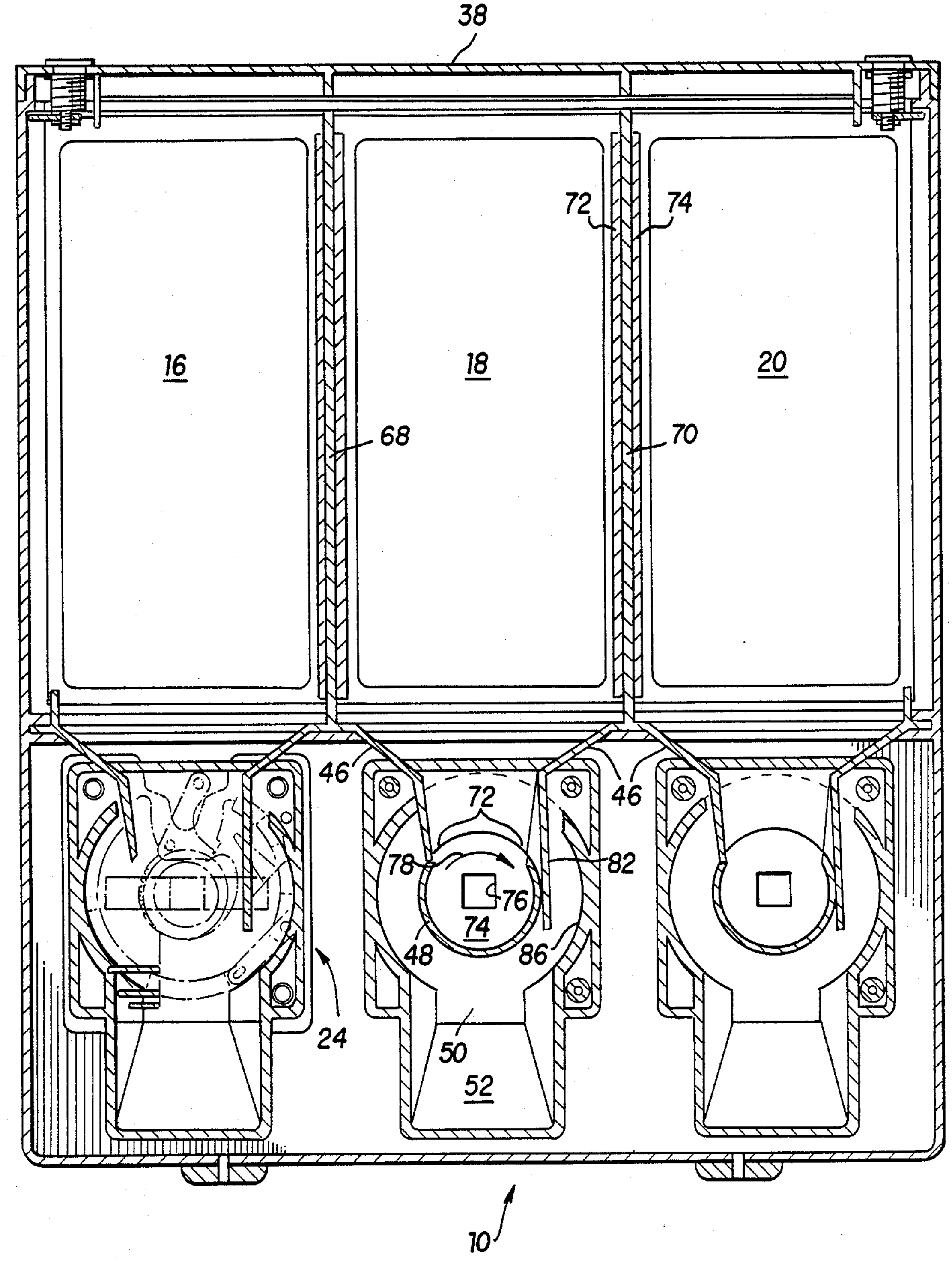
FIG. 3: is a front sectional view taken along lines 3—3 of FIG. 1.

FIG. 3 illustrates a front section of the dispensing unit 10 shown in FIG. 1. As illustrated, 3 individual bays 16, 18, 20 are each provided with a coin-actuation means 24, shown more clearly in FIG. 5. Each of the individual bays are separated by divider means 68, 70 which may be slideably retained within guide members 72, 74 affixed to front and back walls. The individual divider means may be removed through the top of the unit when the top 38 is removed.

The lower funnel portion of 46 of the individual bays funnels product into an aperture 72 of tumbler 48. The forward facing end portion 74 of tumbler 48 is provided with an aperture 76 which cooperates with the handle 28. After a coin is inserted and the handle 28 is rotated in the direction of arrow 78 the aperture 72 rotates about longitudinal axis 80 of tumbler 48 and eventually dumps the product onto the bottom wall 52 of dispensing chamber 50. Flexible antibleed-through means 82 are affixed to the lower funnel portion 46 such that they are spring-loaded in order to bear against the tumbler 48. When the tumbler 48 is rotated about axis 80, the flexible antibleed- through means 82 "sweeps" excess product out of the cavity 84 so that a measured amount of product is delivered to the dispensing chamber 50. Because the flexible antibleed-through means 82 is in effect spring-loaded against the tumbler 48, excess product cannot "bleed" or "leak" between the tumbler 48 and the inner wall 86 of the dispensing chamber 50. Therefore, a measured amount of product is delivered to the dispensing chamber 50, without the financial losses incurred when excess product "bleeds" into the dispensing chamber 50.

It can be readily seen from FIG. 3 that as the tumbler 48 rotates 180°, the flexible antibleed-through means 82 merely sweeps across the aperture 72. Any excess product being carried around by rotation of the tumbler 48 is not pinched between unyielding surfaces, thereby possibly causing breakage or tearing of the product. Rather, the flexible antibleed-through means 82 yields sufficiently prior to returning to its original position so as to avoid product damage. When dealing with easily broken or potentially sticky candy pieces, this feature is especially significant, particularly in hot weather when product breakage is more likely to occur.

Figure 4:
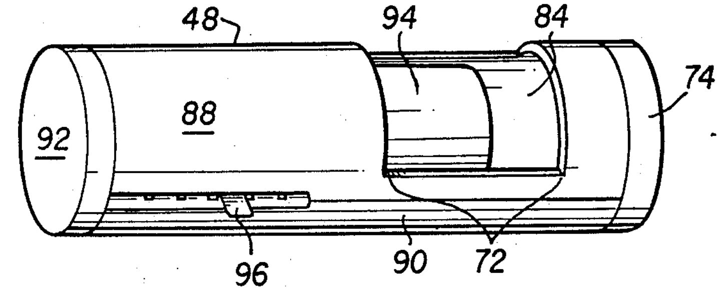
FIG. 4: Is a perspective view of the product dispensing means of the present invention; .

One particularly important feature of the present invention is the adjustable nature of the tumbler 48. As shown in FIG. 4, the tumbler comprises a cylindrical portion comprising upper 88 and lower 90 portions which are held in place by forward facing end portions 74 and rearward facing end portion 92. The two cylindrical halves 88 and 90 and the end portions 74, 92 define the cavity 84 which measures the amount of product to be delivered. Within the cavity 84 is a plunger 94 which is moveable within cavity 84. Preferably, some form of detent means 96 is provided so that the plunger 94 will be securely positioned within cavity 84. As illustrated in FIG. 4, by removing the end cap 92 the halves 88 and 90 may be separated sufficiently to move the detent 96 (and therefore the plunger 94) to a new position either enlarging or reducing the volume of cavity 84.

Figure 5:
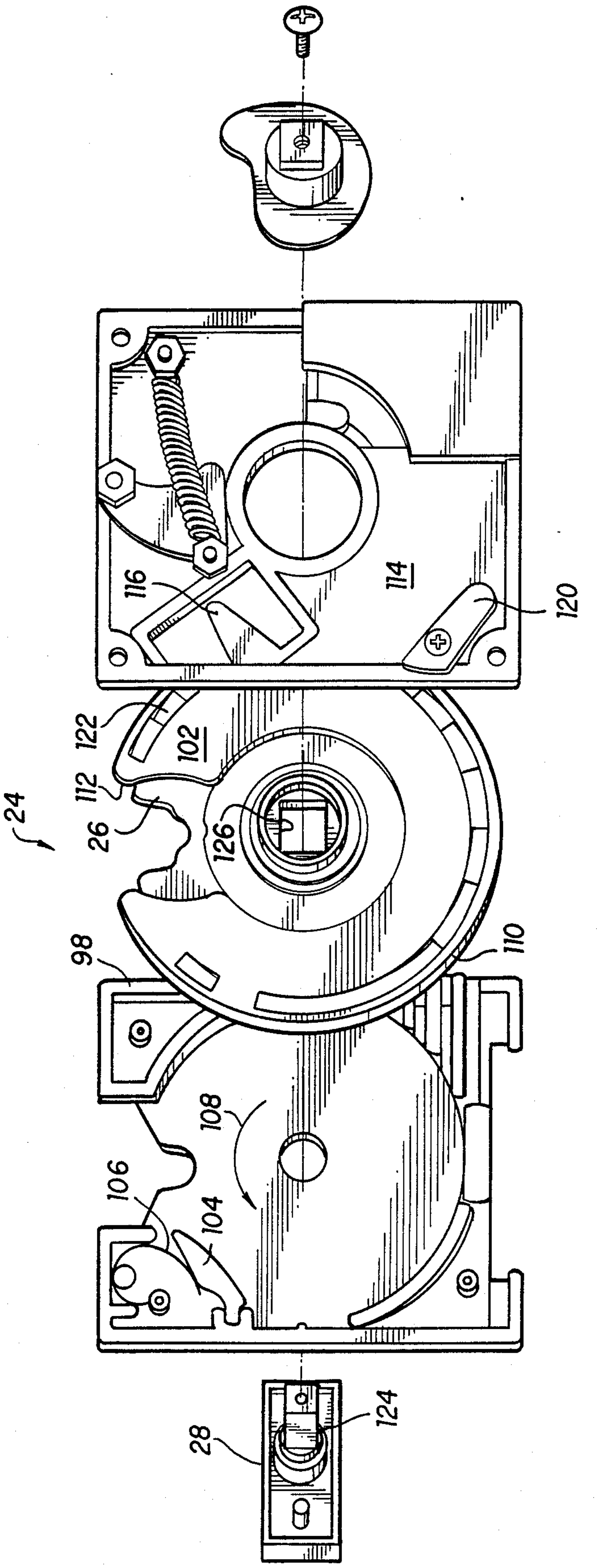
FIG. 5: is an exploded view of the coin-actuation means of the present invention.

The coin-actuation means 24 is shown in exploded view in FIG. 5. The face plate 98 is secured to the front piece 32 of unit 10, as with screws 100 (FIG. 2). The handle 28 protrudes through face plate 98 and is adapted to rotate coin wheel 102 which is fitted with coin slot 26. Face plate 98 is fitted with coin pawl 104 which is biased toward the center of face plate 98 by spring 106. When the coin wheel rotates in the direction of arrow 108 the coin pawl 104 is biased against the outer edge 110 of coin wheel 102. In order to prevent dispensing of product in the absence of a coin, as the coin wheel 102 is rotated an improper coin positioned in the coin slot 26 will cause the inwardly biased coin pawl to move inwardly at the coin slot 26 and abutt against surface 112, thereby preventing further rotation of the coin wheel 102 and tumbler 48.

Completing the coin-actuating means 24 is a back plate 114 which is provided with depth gage means 116 and anti-reverse means 120. The depth gage is biased inwardly (toward the coin wheel 102) so that as the coin wheel rotates, if a coin of improper thickness is present, the depth gage will deflect "inwardly" and will abutt against edge 112, thereby preventing further rotation. As the tumbler 48 reaches a position to dispense product from within cavity 84, the anti-reverse means prevents counter-rotation of the coin wheel 102, thereby preventing further unauthorized dispensing of product. The anti-reverse means 120 comprises an inwardly biased ratchet having a tongue (not shown) which protrudes through back plate 114 and which engages teeth 122 of coin wheel 102. Therefore, while rotation of coin wheel 102 in the direction of arrow 108 is permitted by anti-reverse means 120, counter-rotation is prohibited. As can be seen from FIG. 5, handle 28 is provided with shaft 124 which rotates freely within face plate 98 and back plate 114 but which rotates coin wheel 102 and tumbler 48, as by appropriately sized apertures 126 and 76, respectively. As the coin wheel is rotated past 180°, the coin is "kicked out" by conventional means (not shown) and falls to the inner surface of bottom floor 64.

Figure 6:
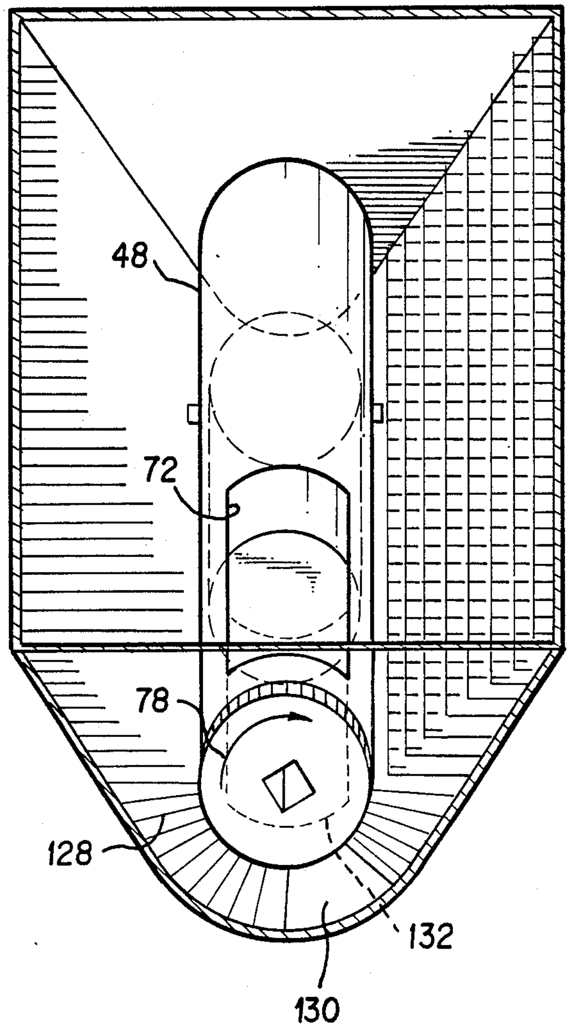
FIG. 6: is a perspective view of an alternate embodiment of the flexible anti-bleed through means of the present invention.

An alternate embodiment of the flexible antibleed-through means is shown in FIG. 6. In this embodiment, the flexible antibleed-through means, rather than being a flexible plastic-like member bearing against the tumbler 48, is provided in the form of variable length bristles 128 which are attached to the inner walls of dispensing chamber 50. These bristles 128 are positioned so that they are in contact with the tumbler 48 throughout at least the lower hemispherical portion of the tumbler 48, with the exception of a "window" 130 through which the product is delivered to the bottom wall 52 of chamber 50. As shown in FIG. 6, when the tumbler is rotated in the direction of arrow 78, the bristles 128 remove product from aperture 72 without the possibility of frictional damage to the product. When the aperture 72 is rotated approximately 180° (as shown in dashed lines at 132), the product drops through the "window" 130 and is removed by the consumer.

While various embodiments of the invention have been disclosed above, it is to be recognized that one skilled in the art may make minor modifications to the embodiments disclosed without departing from the scope of the invention, therefore, the limits of the present invention are to be determined in view of the claims which follow:

I claim:

1. A coin-operated product vending apparatus with a coin-operated product dispensing mechanism, said dispensing mechanism including:

a housing having a lockable back plate for providing controlled access to the product dispensing mechanism;

a hollow cylindrical tumbler means having a cylindrical wall rotatably disposed within a hollow cylindrical product receiving and dispensing container, said tumbler means having a product receiving and dispensing aperture disposed in the cylindrical wall thereof; and a plunger slideably mounted within said tumbler means for regulating the amount of product to be dispensed, said plunger being accessible through said lockable back plate when opened and being adjustable from the exterior of the housing without having to remove said tumbler from the product receiving and dispensing container.

2. An apparatus as set forth in claim 1, wherein said slideable plunger has a plurality of detents along its exterior surface extending through the wall of the tumbler means to secure the plunger at a predetermined location with respect to the tumbler means.

* * * * *